US008885277B1

(12) United States Patent
Erden et al.

(10) Patent No.: US 8,885,277 B1
(45) Date of Patent: Nov. 11, 2014

(54) MODULATION CODING FOR TWO-DIMENSIONAL RECORDING

(71) Applicant: Seagate Technology LLC, Cupertino, CA (US)

(72) Inventors: Fatih Erden, St. Louis Park, MN (US); Barmeshwar Vikramaditya, Eden Prairie, MN (US); Deepak Sridhara, Longmont, CO (US); William Radich, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/143,856

(22) Filed: Dec. 30, 2013

(51) Int. Cl.
*G11B 5/09* (2006.01)
(52) U.S. Cl.
USPC ............... 360/39; 360/43; 360/53; 360/55; 369/59.1
(58) Field of Classification Search
None
See application file for complete search history.

(56) References Cited

U.S. PATENT DOCUMENTS

| 5,732,088 A * | 3/1998 | Sako ............................ 714/701 |
| 6,282,039 B1 * | 8/2001 | Bartlett ......................... 360/48 |
| 2010/0073808 A1 * | 3/2010 | Eppler et al. .............. 360/77.02 |

FOREIGN PATENT DOCUMENTS

WO 2004105252 12/2004

OTHER PUBLICATIONS

Krishnan et al., "Two-Dimensional Magnetic Recording: Read Channel Modeling and Detection," IEEE International Magnetics Conference, Sacramento, CA, May 5-9, 2009, 7 pgs.
Khatami, Mehrdad, "Combined Modulation and Error Correction Decoder for TDMR Using Generalized Belief Propagation," Department of Electrical and Computer Engineering, University of Arizona, Tucson, AZ, 85721, 2013, 7 pgs.
Krishnan, Anantharaman, "Signal Processing for Two-Dimensional Magnetic Recording," Department of Electrical and Computer Engineering, University of Arizona, Tucson, AZ, 85721, 2011, 99 pgs.

* cited by examiner

*Primary Examiner* — Muhammad N Edun
(74) *Attorney, Agent, or Firm* — Taylor English Duma LLP (57) ABSTRACT

Technologies are described herein for implementing modulation coding schemes for TDMR. A data sequence is received to be stored on a first data track of a recording media. The first data sequence is encoded into a first codeword sequence using a modulation coding scheme, and the first codeword sequence is written to the first data track of the recording media. Subsequently, a second data sequence is received to be stored on a second data track of the recording media, the second data track being adjacent to the first data track. A second codeword sequence is generated for the second data sequence based on the first codeword sequence on the first data track, and the second codeword sequence is written to the second data track of the recording media.

20 Claims, 7 Drawing Sheets

MODULATION CODING FOR TWO-DIMENSIONAL RECORDING

BRIEF SUMMARY

The present disclosure relates to technologies for implementing modulation coding mechanisms for two-dimensional magnetic recording ("TDMR"). The modulation coding mechanisms may be implemented in the magnetic recording channel of a storage device, such as a hard-disk drive ("HDD"). According to some embodiments, a method comprises receiving a first data sequence to be stored on a first data track of a recording media of the storage device. The first data sequence is encoded into a first codeword sequence using a modulation coding scheme, and the first codeword sequence is written to the first data track of the recording media. Subsequently, a second data sequence is received to be stored on a second data track of the recording media, the second data track being adjacent to the first data track. A second codeword sequence is generated for the second data sequence based on the first codeword sequence on the first data track, and the second codeword sequence is written to the second data track of the recording media.

According to further embodiments, a system comprises a hard disk drive having a magnetic recording channel and a two-dimensional modulation encoder having a storage area containing adjacent track data. The two-dimensional modulation encoder is configured to receive a data sequence to be stored on a data track of a recording media of the hard disk drive and encode the data sequence into a codeword sequence. The two-dimensional modulation encoder then transforms the codeword sequence such that alignment of long marks between the codeword sequence and a codeword sequence written to an adjacent track on the on the recording media are minimized.

According to further embodiments, a method comprises receiving a data sequence to be stored on a data track of a recording media. The data sequence is encoded to a codeword sequence using a modulation coding scheme. An overlap metric is determined for the codeword sequence indicating an amount of alignment between long marks of the codeword sequence and long marks of a codeword sequence written to an adjacent data track. It is determined whether the overlap metric is less than a threshold level, and, upon determining that the overlap metric is not less than the threshold level, the codeword sequence is transformed such that the overlap metric is minimized.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for utilizing conventional modulation coding schemes in two-dimensional magnetic recording ("TDMR") or multi-signal magnetic recording ("MSMR"). TDMR seeks to increase recording density of the recording media in a storage device without requiring substantial alterations to the conventional storage media, as may be required by other technologies such as heat-assisted magnetic recording or bit-patterned media. Instead, TDMR implements improvements in the magnetic recording channel to allow increased storage density of conventional recording media. The magnetic recording media of a typical storage device is inherently a two-dimensional system comprising magnetic grains on the surface(s) of the medium. TDMR may incorporate aggressive reading and writing strategies, such as shingled magnetic recording ("SMR"), multiple reader elements, and two-dimensional read-channel modeling to account for this two-dimensional nature of the magnetic media surface and to increase areal density of the stored data.

Conventional storage devices may implement a one-dimensional layout on the recording media by defining concentric data tracks comprising a number of sectors for storing data. These storage devices may treat each sector of data independently, reading or writing any given sector of data when requested independent of the data located in sectors of adjacent tracks. In order to minimize the cross-track effects of each independent write or read, such as track mis-registration ("TMR") effects, sufficient margins between tracks are included in the layout on the recording media. For example, in order not to partially erase the adjacent track in presence of a write TMR effect, a pre-determined margin is included in the track pitch, and additional pre-determined margin may be added in order to eliminate any inter-track interference that may occur while reading adjacent tracks.

Any improvement in the magnetic recording channel that allows for reduction of the size of the pre-determined write/read TMR margins in the layout results in improvements in system reliability for a given areal density ("AD"), and may also result in improvements in AD for a given servo capability. According to embodiments described herein, one such improvement includes the use of a two-dimensional modulation coding mechanism that takes into account data written to adjacent tracks to encode data sequences before writing the data to the recording surface. In some embodiments, the two-dimensional modulation coding mechanism may be implemented in the magnetic recording channel of a storage device, such as a hard-disk drive ("HDD").

As will be described in detail below in regard to FIG. 5, when data is written to the magnetic recording surface of the disk media, long strings of consecutive 1s or 0s, referred to herein as "marks," may result in wide cross-track areas on the surface of a specific magnetic polarity. While the length of such marks may be restricted by conventional one-dimensional modulation coding constraints, the cross-track width of these areas resulting from a maximum run of consecutive 1s or 0s may dictate the required TMR margin. According to embodiments, by using knowledge of the encoded data written to adjacent track(s) and/or sector(s), a two-dimensional modulation coding mechanism can optimize the bits of the encoded data sequence in order to reduce occurrences of marks written to the recording surface overlapping those in adjacent tracks, thus reducing the required pre-determined TMR margins and potentially decreasing track pitch and/or increasing AD of the recording media. While information regarding data written to adjacent tracks may not be available in conventional magnetic recording channels, recording channels designed to implement SMR and/or TDMR may have such information available for the two-dimensional modulation coding mechanism to utilize. In further embodiments, the two-dimensional modulation coding mechanism may utilize conventional, one-dimensional modulation coding schemes for TDMR.

Figure 1:
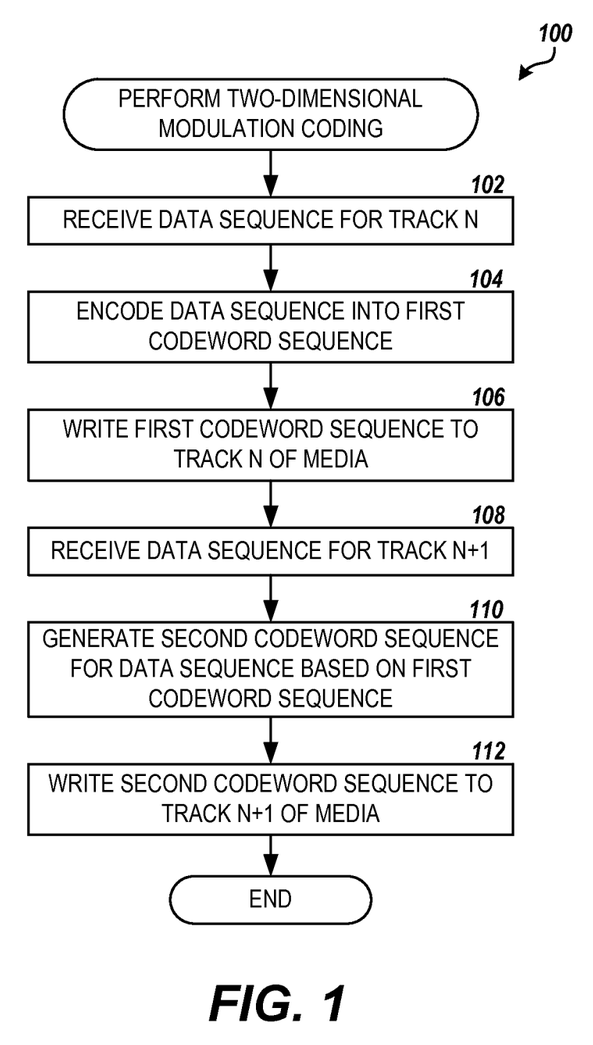
FIG. 1 is a flow diagram showing one method of performing modulation encoding of data for storage on adjacent tracks in a storage device, according to embodiments described herein.

FIG. 1 provides an example of one implementation of a two-dimensional modulation coding mechanism. Specifically, FIG. 1 illustrates one routine 100 for performing modulation encoding of data for storage on adjacent tracks in a storage device, according to some embodiments. The routine 100 may be performed in conjunction with the write of data sequences to the magnetic recording media of the storage device, for example. According to some embodiments, the routine 100 may be performed in the read/write channel of the storage device.

The routine 100 begins at step 102, where a data sequence is received to be written to track N of the recording media of the storage device. The data sequence may comprise a sequence of ones and zeroes ("1s and 0s"). From step 102, the routine 100 proceeds to step 104, where the received data sequence is encoded by the two-dimensional modulation coding mechanism utilizing a modulation coding scheme to produce a first codeword sequence for writing to the recording media. The resulting codeword sequence may comply with a number of constraints enforced by the modulation coding scheme and designed to improve reliability of the read-back of the codeword sequence from the recording surface in the down-track direction. Several types of modulation coding schemes may be available in the magnetic recording channel to the two-dimensional modulation coding mechanism, including run-length limited ("RLL") and running digital sum ("RDS") codes, which limit the number of consecutive 1s and 0s in the codeword sequences, maximum transition run ("MTR") codes, which limit the number of consecutive transitions allowed in the channel signal, Markov codes implementing probabilistic and/or deterministic constraints, and the like. Conventional modulation coding schemes may be implemented in the read/write channel of the storage device using simple algorithms and/or lookup tables, for example.

The routine 100 proceeds from step 104 to step 106, where the generated first codeword sequence is written to track N on the recording media via the magnetic recording channel of the storage device. As shown at step 108, another data sequence is subsequently received to be written to track N+1 of the recording media, track N+1 being adjacent to track N. From step 108, the routine 100 proceeds to step 110, where the two-dimensional modulation coding mechanism generates a second codeword sequence for the received data sequence. According to embodiments, the second codeword sequence is generated based on the first codeword sequence written to track N such as to minimize or eliminate alignment or overlap of long marks between the adjacent tracks, as will be described in more detail below in regard to FIGS. 6 and 7.

In some embodiments, generation of the second codeword sequence may include the selection of a modulation coding scheme that is complimentary to that utilized to generate the first codeword sequence written to the adjacent track. Complimentary modulation coding schemes may be determined by performing simulations of the modulation encoding of random data to be written to adjacent tracks and determining those pairs of modulation encoding schemes that result in minimal overlap of long marks in the adjacent data on the recording surface. The complimentary encoding schemes may be stored in a table for lookup by the two-dimensional modulation coding mechanism. In further embodiments, the two-dimensional modulation coding mechanism may encode the received data sequence utilizing multiple modulation coding schemes implemented in the read/write channel of the storage device, either serially or in parallel. The two-dimensional modulation coding mechanism may then select the second codeword sequence to be written to track N+1 from among the encoded codeword sequences based on the overlap of long marks with the first codeword sequence written to the adjacent track N.

In some embodiments, generation of the second codeword sequence may include transforming the encoded sequence through a one-to-one mapping of the codeword sequence. This may include a simple cyclic shift of the data in the encoded codeword sequence until the number of overlapping long marks between the second codeword sequence and the first codeword sequence is minimized. In further embodiments, the two-dimensional coding mechanism may utilize a scrambler to map the encoded sequence to another codeword sequence where the number of overlapping long marks between the second codeword sequence and the first codeword sequence is minimized. It will be appreciated that generation of the second codeword sequence based on the first codeword sequence may include any combination of the selection of modulation coding schemes, cyclic shifting of the codeword sequence, mapping of the codeword sequence to a new codeword sequence, and the like, as will become apparent below. It is intended that this application include all such methods of generation of the second codeword sequence based on the first codeword sequence.

From step 110, the routine 100 proceeds to step 112, where the generated second codeword sequence is written to track N+1 on the recording media via the magnetic recording channel of the storage device. From step 112, the routine 100 ends. While the routine 100 is shown in FIG. 1 and described herein as generating codeword sequences to be written to two adjacent data tracks N and N+1 on the recording media, it will be appreciated by one skilled in the art that the routine 100 may be generalized for use in encoding of data sequences for any number of adjacent tracks, such as the generation of a codeword sequence to be written to track N based on data written to track N−1 and track N+1, and the like.

Figure 2:
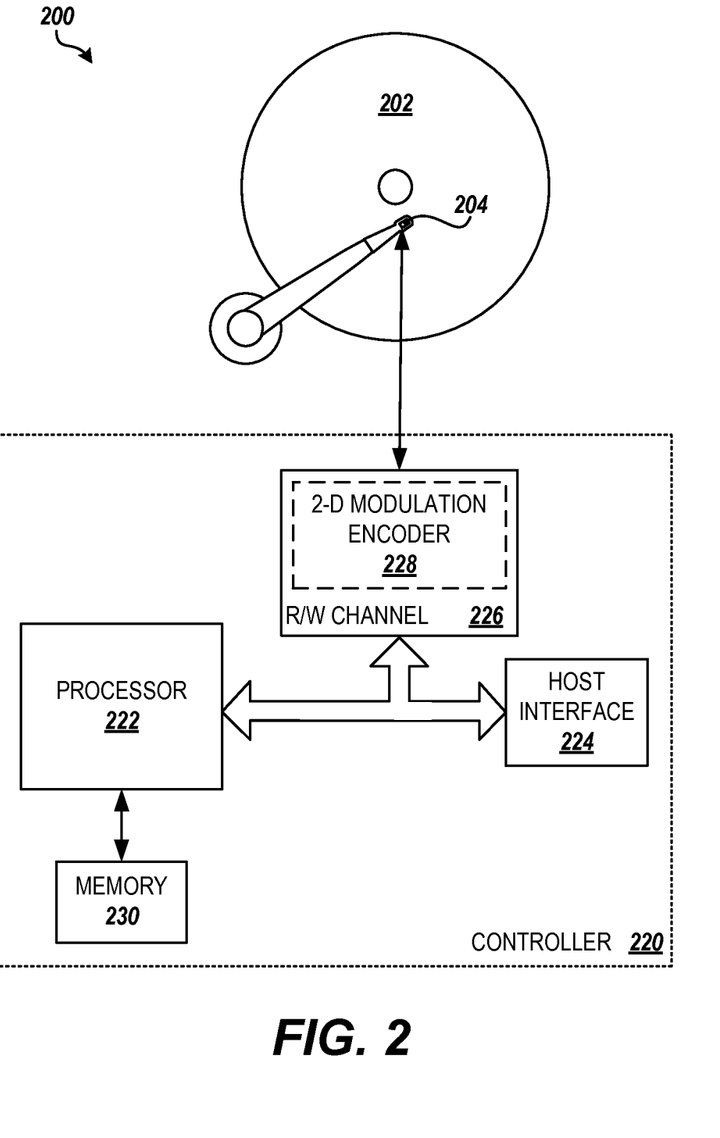
FIG. 2 is a block diagram showing an illustrative environment for implementing a two-dimensional modulation coding mechanism in a storage device, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for implementing a two-dimensional modulation coding mechanism for a magnetic data channel of the storage device, according to the embodiments provided herein. The storage device 200 may include recording media comprising at least one platter or disk 202.

The storage device 200 further includes at least one read/write head 204 located adjacent to a magnetic recording surface of each disk 202. The read/write head 204 may read information from the disk 202 by sensing a magnetic field formed on portions of the surface of the disk, and may write information to the disk by magnetizing a portion of the surface of the disk. It will be appreciated by one of ordinary skill in the art that the read/write head 204 may comprise multiple components, such as one or more magneto-resistive ("MR") or tunneling MR reader elements, an inductive writer element, a slider, multiple sensors, and the like.

Figure 3:
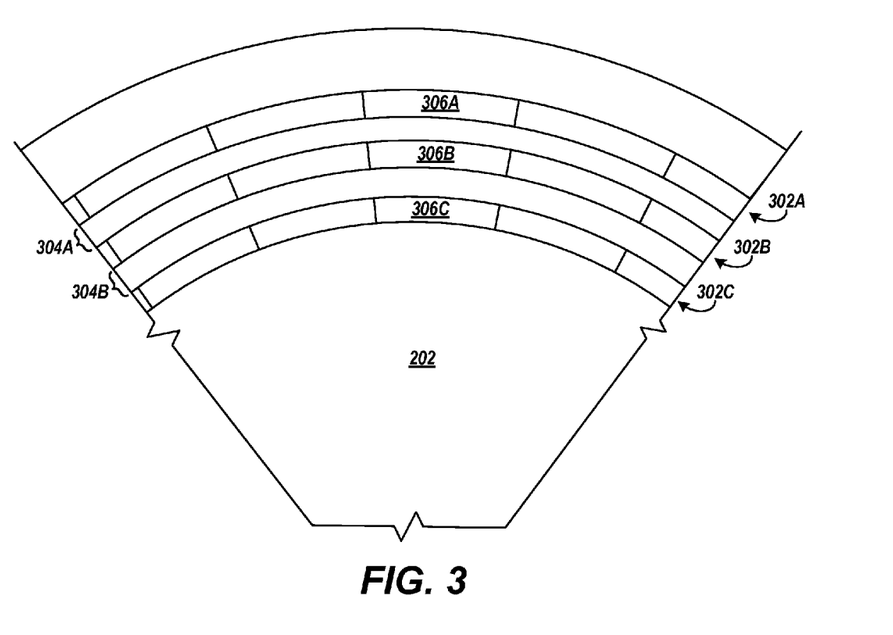
FIG. 3 is a block diagram showing an illustrative layout of data tracks and sectors on disk media, according to embodiments described herein.

The surface of the disk 202 may be divided or "formatted" into a number of individual data tracks, such as data tracks 302A-302C (referred to herein generally as data tracks 302) shown in FIG. 3. The data tracks 302 may represent substantially concentric circular areas on the surface of the disk 202 into which the user data stored on the storage device 200 is written. To account for TMR effects and other factors of the magnetic recording channel, each data track may be separated by a pre-determined gap or margin, such as margins 304A and 304B (referred to herein generally as margins 304). It will be appreciated that the size of the margins 304 required affects the track pitch, often expressed in tracks per inch ("TPI"), or AD of the recording media. As further shown in FIG. 3, each data track 302A-302C may further be divided or formatted into a number of sectors, such as sectors 306A-306C (referred to herein generally as sectors 306). The sectors 306 may represent independent areas of the data track 302 in which user data is stored. It will be appreciated that the sector boundaries of one data track 302 may not align with the sector boundaries of an adjacent data track, and that the number of sectors 306 per track may vary from data track 302 to data track on the surface of the disk 202.

Returning to FIG. 2, the storage device 200 may further comprise a controller 220 that controls the operations of the storage device. The controller 220 may include a processor 222. The controller may further comprise a host interface 224 allowing the storage device 200 to communicate with a host device, other parts of storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transfer the formatted data via a read/write channel 226 through the read/write head 204 and to the magnetic recording surface of the disk 202. The processor 222 may further process read commands from the host device by determining the location of the desired data on the surface of the disk 202, moving the read/write head(s) 204 over the determined location, reading the data from the surface of the disk via the read/write channel 226, correcting any errors and formatting the data for transfer to the host device.

The read/write channel 226 may convert data between the digital signals received at the host interface 224 and/or processed by the processor 222 and the analog signals conducted through the read/write head 204 for reading and writing data to the surface of the disk 202. The analog signals to and from the read/write head 204 may be further processed through a pre-amplifier circuit. The read/write channel 226 may further provide servo data read from the disk 202 to an actuator to position the read/write head 204. The read/write head 204 may be positioned to read or write data to a location on the surface of the disk 202 by moving the read/write head 204 radially across the disk using the actuator while a motor rotates the disk to bring the target location under the read/write head.

The controller 220 may further contain a two-dimensional modulation encoder 228. According to some embodiments, the two-dimensional modulation encoder 228 may implement the two-dimensional modulation coding mechanism described herein. The two-dimensional modulation encoder 228 may comprise a hardware circuit in the read/write channel 226, processor-executable instructions for execution in the processor 222, or any combination of these and other components in the controller 220. As described herein, the two-dimensional modulation encoder 228 may generate codeword sequences for data sequences to be written to a data track 302 on the disk 202 based on the data written to adjacent tracks.

The controller 220 may further include a computer-readable storage medium or "memory" 230 for storing processor-executable instructions, data structures and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). For example, the memory 230 may store a firmware that comprises commands and data necessary for performing the operations of the storage device 200. In addition to the memory 230, the environment may include other computer-readable media storing program modules, data structures, and other data described herein for implementing a two-dimensional modulation coding mechanism in the storage device 200.

It will be appreciated by those skilled in the art that computer-readable media can be any available media that may be accessed by the controller 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, EPROM, EEPROM, FLASH memory, RRAM, STRAM, or other solid-state memory technology; CD-ROM, DVD, BLU-RAY, or other optical storage; magnetic disk storage or other magnetic storage devices; and the like.

It will be appreciated that the structure and/or functionality of the storage device 200 may be different than that illustrated in FIG. 2 and described herein. For example, the processor 222, read/write channel 226, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 4:
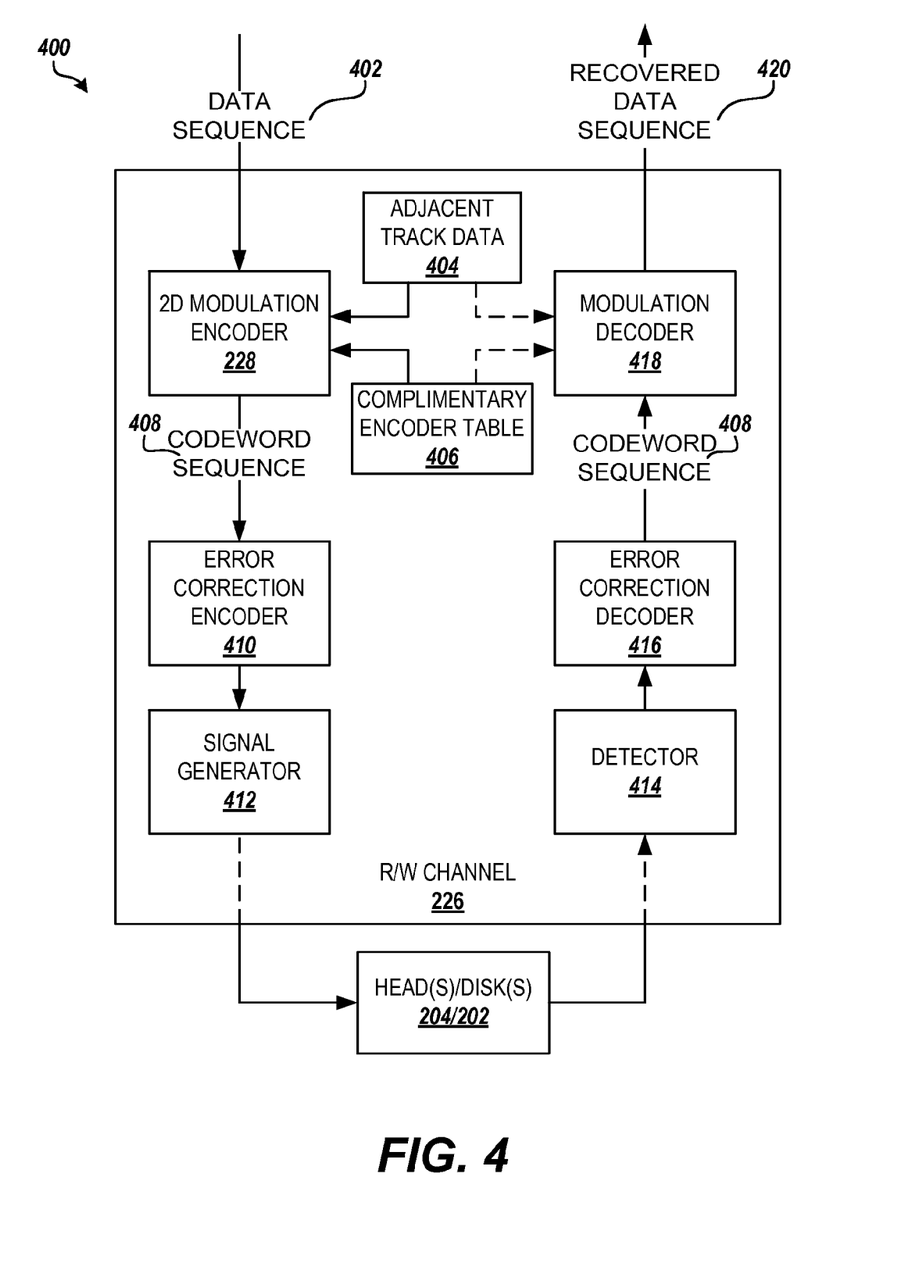
FIG. 4 is a block diagram showing additional details regarding a magnetic recording channel of a storage device having a two-dimensional modulation coding mechanism, according to embodiments described herein.

FIG. 4 shows an illustrative magnetic recording channel 400 of a storage device 200 having a two-dimensional modulation coding mechanism, according to some embodiments described herein. As used herein, the magnetic recording channel 400 may refer to a combination of the read/write channel 226 and the read/write head(s) 204 and disk(s) 202 of the storage device 200, including any intervening signal equalizers, amplifiers, and/or other components not shown in FIG. 4. According to embodiments, the magnetic recording channel 400 receives a data sequence 402 to be stored on the recording media or disk 202 of the storage device 200. As described above, the data sequence 402 may comprise a sequence of 1s and 0s. The data sequence 402 may be received from the host device through the host interface 224 and/or from the processor 222. As is known in the art, the data sequence 402 is processed and converted to a data signal to be written to the magnetic recording surface of a disk 202 through the corresponding read/write head 204 by the read/write channel 226 of the controller 220. This processing includes generation of a codeword sequence 408 from the data sequence 402 for writing to disk 202, referred to herein as modulation encoding. This may be accomplished by the two-dimensional modulation encoder 228 described above in regard to FIG. 2.

According to some embodiments, the two-dimensional modulation encoder 228 may utilize conventional one-dimensional modulation coding schemes for encoding the data sequence 402 to produce the codeword sequence 408 to be written to a target data track 302, such as track N+1. In some embodiments, the two-dimensional modulation encoder 228 may utilize a complimentary encoder table 406 to select a complimentary encoding scheme based on the codeword sequence(s) written to adjacent data track(s) 302, such as such as track N. The complimentary encoder table 406 may contain pairs of complimentary modulation coding schemes determined by performing simulations of the modulation encoding of random data to be written to adjacent tracks and determining those pairs of modulation encoding schemes that result in minimal overlap of long marks in the adjacent data on the recording surface, for example. The complimentary encoder table may be stored in a memory of the read/write channel 226, in the memory 230 of the controller 220, or in another storage area of the storage device 200.

According to further embodiments, the two-dimensional modulation encoder 228 utilizes adjacent track data 404 to generate the codeword sequence 408 to minimize the overlap of long marks in the adjacent tracks. The adjacent track data 404 may store the codeword sequences written to adjacent data tracks 302, such as track N. According to some embodiments, the adjacent track data 404 may be stored in a cache or memory of the read/write channel, in the memory 230 of the controller 220, or in another storage area of the storage device 200.

The codeword sequence 408 generated by the two-dimensional modulation encoder 228 may then be further processed by the read/write channel 226, such as by adding error correction information by way of an error correction encoder 410, before being converted to a signal by a signal generator 412. The signal may then be written to the magnetic recording surface of the disk 202 via the writer element of the read/write head 204. Similarly signals read from the disk 202 by the reader element of the read/write head 204 may be converted back to a digital signal by a detector 414, and then further processed by the read/write channel 226 to recover the codeword sequence 408. This processing may include recovering from data errors in the read signal by utilizing a complimentary error correction decoder 416, for example. The recovered codeword sequence 408 is then decoded by an appropriate modulation decoder 418 component to recover the data sequence 420. In some embodiments, the modulation decoder 418 may complement the two-dimensional modulation encoder 228, and may utilize the same adjacent track data 404 and/or complimentary encoder table 406 used by the two-dimensional modulation encoder to decode the recovered codeword sequence 408. The recovered data sequence 420 may then be provided back to the processor 222 and/or host device.

Figure 5:
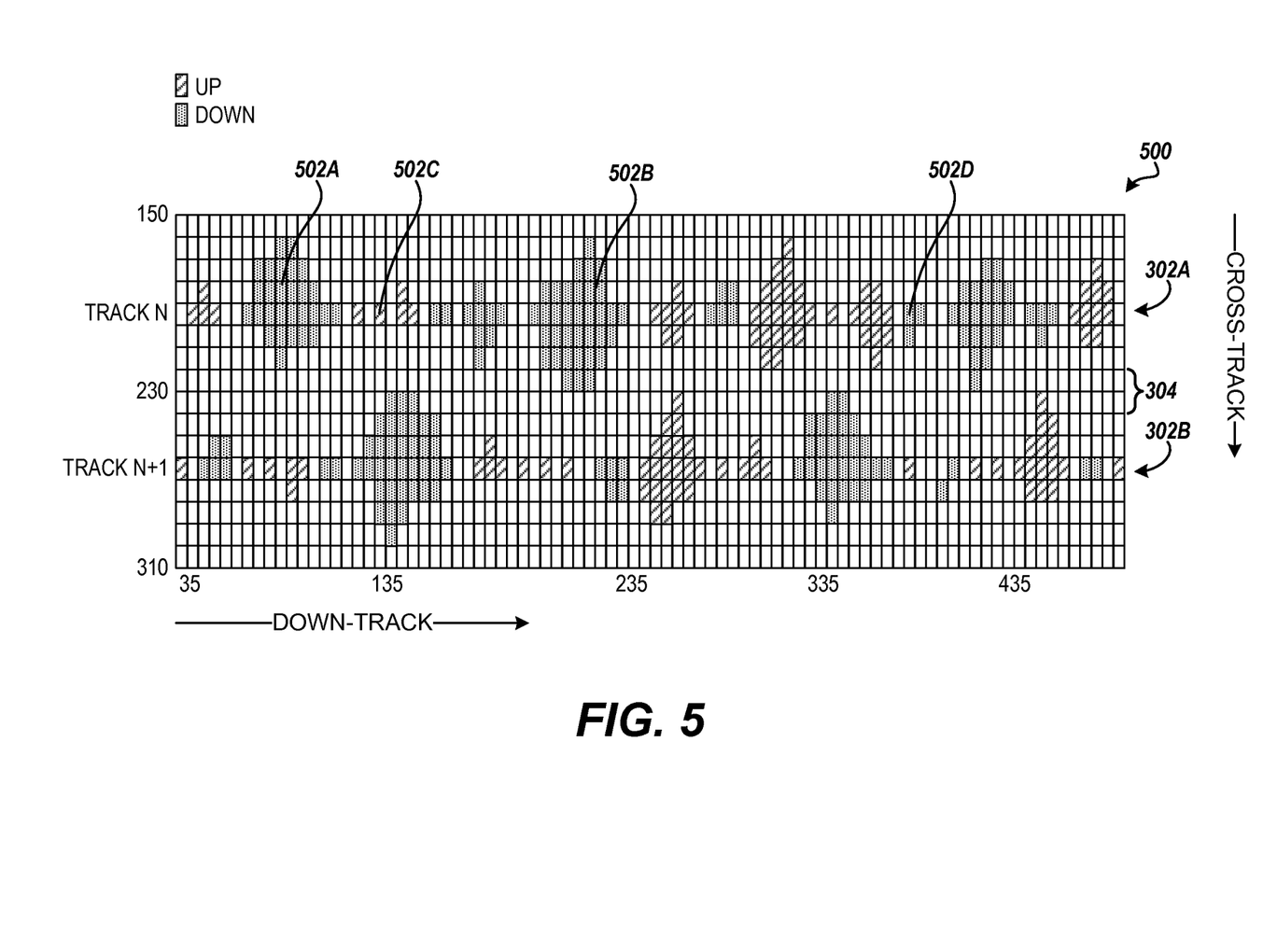
FIG. 5 is a block diagram showing a simulated map of a magnetic recording surface of disk media, including the storage of data on adjacent data tracks, according to embodiments described herein.

FIG. 5 shows an illustrative map 500 of the magnetic recording surface of a disk 202 in the storage device 200 showing the storage of data in two adjacent data tracks, track N 302A and track N+1 302B. The map 500 contains simulated areas of up and down magnetic polarization of the magnetic recording surface representing the 1s and 0s of the codeword sequences 408 stored on the data tracks 302A and 302B, such as areas 502A-502D (referred to herein generally as areas 502 or marks 502). As may be seen in the figure, long marks of consecutive 1s or 0s written in the down-track direction of the data track 302 may tend to make the area of magnetic polarization, such as areas 502A and 502B, wider in the cross-track direction than marks of shorter length, such as areas 502C and 502D. While the down-track length of such marks 502 may be restricted by modulation coding constraints, the cross-track width of these marks resulting from a maximum run of consecutive 1s or 0s may dictate both the track width and any required TMR margin 304, and thus the TPI of the recording media.

As may be further seen in FIG. 5, the two-dimensional encoding mechanism utilizes the data written to an adjacent track N 302A to generate the codeword sequence 408 to be written to track N+1 in such a way as to minimize or eliminate the alignment or overlap of long marks 502 in the codeword sequence with long marks in the adjacent track N. This provides for better reliability in the readback of data from the data tracks 302A, 302B on the disk media with a given track pitch and margin 304. This may also allow a smaller track pitch and/or pre-determined margin 304 to be implemented in the format of the disk 202, resulting in increased AD of the recording surface of the disk. In further embodiments, it may be desirable to limit the overlap of data patterns other than strings of consecutive 1s and 0s. As such, "long marks" as utilized herein may be generalized to include other data patterns beyond consecutive 1s or 0s that may cause problems in readback when aligned between adjacent data tracks, such as tracks 302A and 302B.

Figure 6:
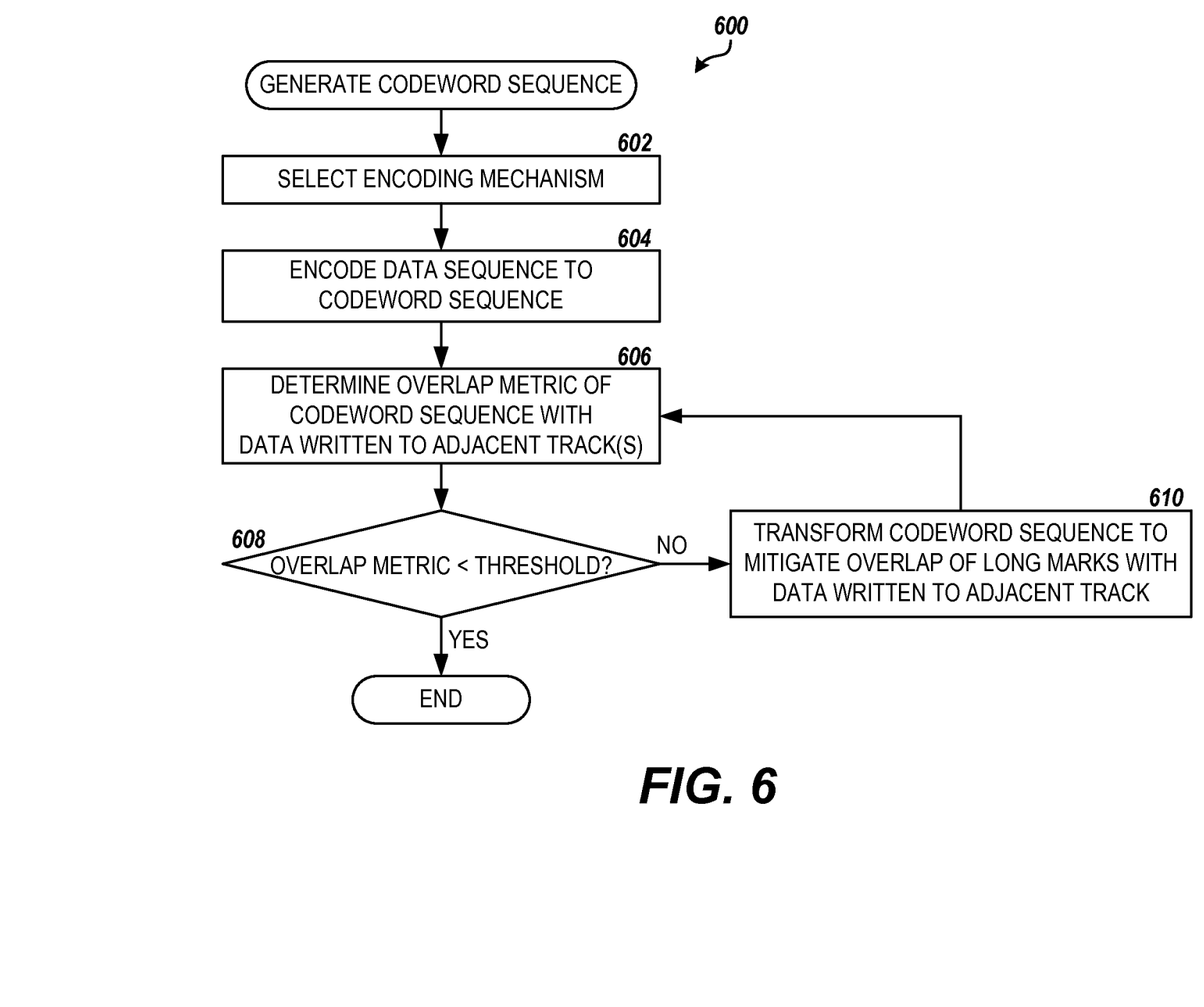
FIG. 6 is a flow diagram showing a serial encoding routine of a two-dimensional modulation coding mechanism, according to embodiments described herein.

FIG. 6 illustrates one routine 600 for generating a codeword sequence 408 from a data sequence to be written to a data track N+1 302B based on data written to an adjacent track, such as data track N 302A, according to some embodiments. According to some embodiments, the routine 600 may be performed by the two-dimensional modulation encoder 228 implemented in the read/write channel 226 of the storage device 200, as described above in regard to FIG. 2. In further embodiments, the routine 600 may be performed by the processor 222 implemented in the controller 220 of the storage device 200, or by any combination of these and/or other components, modules, processors, and devices.

The routine 600 begins at step 602, where the two-dimensional modulation encoder 228 selects a modulation coding scheme to encode the received data sequence to be written to the target data track N+1 302B. In some embodiments, the two-dimensional modulation encoder 228 may select a complimentary modulation coding scheme based on the modulation coding scheme utilized to encode the data sequence stored in the adjacent data track N 302A. Complimentary modulation coding schemes may be determined a priori, e.g. at design-time of the storage device 200, by performing simulations of the modulation encoding of random data to be written to adjacent tracks 302 and determining those pairs of modulation encoding schemes that result in minimal overlap of long marks 502 in the adjacent data on the recording surface. The complimentary encoding schemes may be stored in the complimentary encoder table 406 described above in regard to FIG. 4, and the two-dimensional modulation encoder 228 may look up the complimentary modulation coding scheme from the table based on the modulation coding scheme utilized to encode the data sequence stored in the adjacent data track N 302A. The modulation coding scheme utilized to encode the data in the adjacent track N 302A may be read from the adjacent track data 404, for example.

In other embodiments, the two-dimensional modulation encoder 228 may select the same modulation coding scheme utilized for the data in the adjacent data track N 302A. In some embodiments, the two-dimensional modulation encoder 228 may select from among multiple modulation coding schemes implemented in the read/write channel 226 of the storage device 200 (e.g. RDS, MTR, Markov codes, etc.) based on down-track constraint considerations and independent of the modulation coding scheme utilized for the data in the adjacent data track N 302A. From step 602, the routine 600 proceeds to step 604, where the two-dimensional modulation encoder 228 encodes the received data sequence utilizing the selected modulation coding scheme to generate the codeword sequence 408 to be written to the target data track N+1 302B.

The routine 600 then proceeds from step 604 to step 606, where the two-dimensional modulation encoder 228 determines an overlap metric of the generated codeword sequence 408 based on the data written to the adjacent track N 302A. The two-dimensional modulation encoder 228 made determine the overlap metric by measuring the number and scope of overlapping long marks and/or the alignment of short marks with long marks and vice versa between the codeword sequence 408 and the data written to the adjacent track 302A. According to some embodiments, the two-dimensional modulation encoder 228 may obtain the data written to the adjacent track 302A from the adjacent track data 404 described above in regard to FIG. 4. In other embodiments, the two-dimensional modulation encoder 228 may read the data written to the adjacent track 302A from the disk 202 to determine the overlap metric.

The overlap metric may represent the amount of alignment or overlap of long marks 502 in the codeword sequence 408 with long marks in the adjacent track N, as discussed above in regard to FIG. 5. In some embodiments, long marks may be defined as a string of 5 or more consecutive 1s or 0s, while short marks are defined as three consecutive 1s or 0s or less. The overlap metric may represent a count of overlapping long marks 502 between the adjacent tracks 302A and 302B, a fraction of the length of the codeword sequence 408 that has overlapping marks with data in adjacent track(s), a measure of the alignments of short marks in the codeword sequence with long marks in the adjacent track(s) and vice-versa, or some other metric. In further embodiments, the overlap metric may represent a measurement of other undesirable cross-track data patterns beyond the overlap of long marks, such as runs of cross-track transitions or the like.

The routine 600 proceeds from step 606 to step 608 where the two-dimensional modulation encoder 228 determines whether the overlap metric for the codeword sequence 408 is less than some threshold level for the metric. The threshold level may represent a fraction of the codeword sequence length where long marks 502 overlap those in adjacent data track(s), a maximum number of overlapping long marks, and the like. The threshold level may be set based on an acceptable bit-error-rate ("BER") specification at the output of the detector 414, for example. The threshold level may be determined a priori, e.g. at design time of the storage device 200, based on simulations in which the BER is determined at different threshold levels. It will be appreciated by one skilled in the art that the acceptable BER specification may be further dependent on the form of error correction scheme implemented in the read/write channel 226.

In some embodiments, different threshold levels may be established for overlap metrics representing the overlap of different data patterns beyond strings of consecutive 1s and 0s. For example, the overlap of long marks of one specific data pattern may be found to cause severe issues upon readback, and the threshold level for the overlap metric representing the overlap of the more severe pattern may be lower than other threshold levels. A list of undesirable data patterns and the corresponding threshold levels may be determined a priori, e.g. at design time of the storage device 200, based on simulations in which the BER is determined at different threshold levels of the overlap metrics for each of the undesirable data patterns.

If the overlap metric for the codeword sequence 408 is not less than the threshold level for the metric, then the routine 600 proceeds from step 608 to step 610, where the two-dimensional modulation encoder 228 transforms the codeword sequence 408 to further minimize the overlap of long marks 502 with those in adjacent data tracks 302. In some embodiments, transformation of the codeword sequence 408 may include shifting the bits of the sequence by some number of bits and then returning to step 606 to determine if the overlap metric for the transformed codeword sequence is now less than the threshold level. For example, if the size of the data sequence to be written is 4096 bits (a common size for a sector 306), the two-dimensional modulation encoder 228 may shift the codeword sequence 408 by one bit at a time until the overlap metric is less than the threshold level. In other embodiments, the two-dimensional modulation encoder 228 may shift the codeword sequence 408 by 10 bits, and then 20 bits, and then 30 bits, then 50 bits, and so on until the overlap metric is less than the threshold level.

Alternatively, the two-dimensional modulation encoder 228 may determine the overlap metric for all 4096 possible cyclically shifts of the codeword sequence 408 and choose the one that ensures that the overlap metric is minimized. An advantage of using the cyclic shift to transform the codeword sequence 408 is that the down-track modulation constraints on the codeword sequence are not affected but the cross-track constraints are improved by avoiding too many overlapping long runs between the two adjacent data tracks 302A and 302B. The cyclic shift information (e.g. the number of bits shifted) may also be recorded by the two-dimensional modulation encoder 228 as header information in the data written to the target data track N+1 402B in order to allow the modulation decoder 418 to be able to recover the original codeword sequence 408 during the read operation and before decoding the recovered data sequence 420.

In further embodiments, transformation of the codeword sequence 408 may include mapping the codeword sequence to another codeword sequence, using a mapping table or a random "scrambling operation." The codeword sequences in the mapping table and/or seeds for a fixed scrambler may be selected to ensure that 1) the down-track modulation constraints are not significantly affected and 2) the cross-track constraints (overlap of long marks 502 with adjacent tracks) are sufficiently improved. The mapping or scrambling operation of the codeword sequence 408 may be repeated until the overlap metric is less than the threshold level. Once it is determined that the overlap metric is less than the threshold level at step 608, the routine 600 ends and the generated codeword sequence 408 is written to the target data track N+1 402B. In some embodiments, the two-dimensional modulation encoder 228 may only perform the cyclic shifting and/or mapping or scrambling operations a pre-determined maximum number of iterations before proceeding to write the transformed codeword sequence 408 to the disk 202, despite the fact that the overlap metric is not less than the threshold level.

Figure 7:
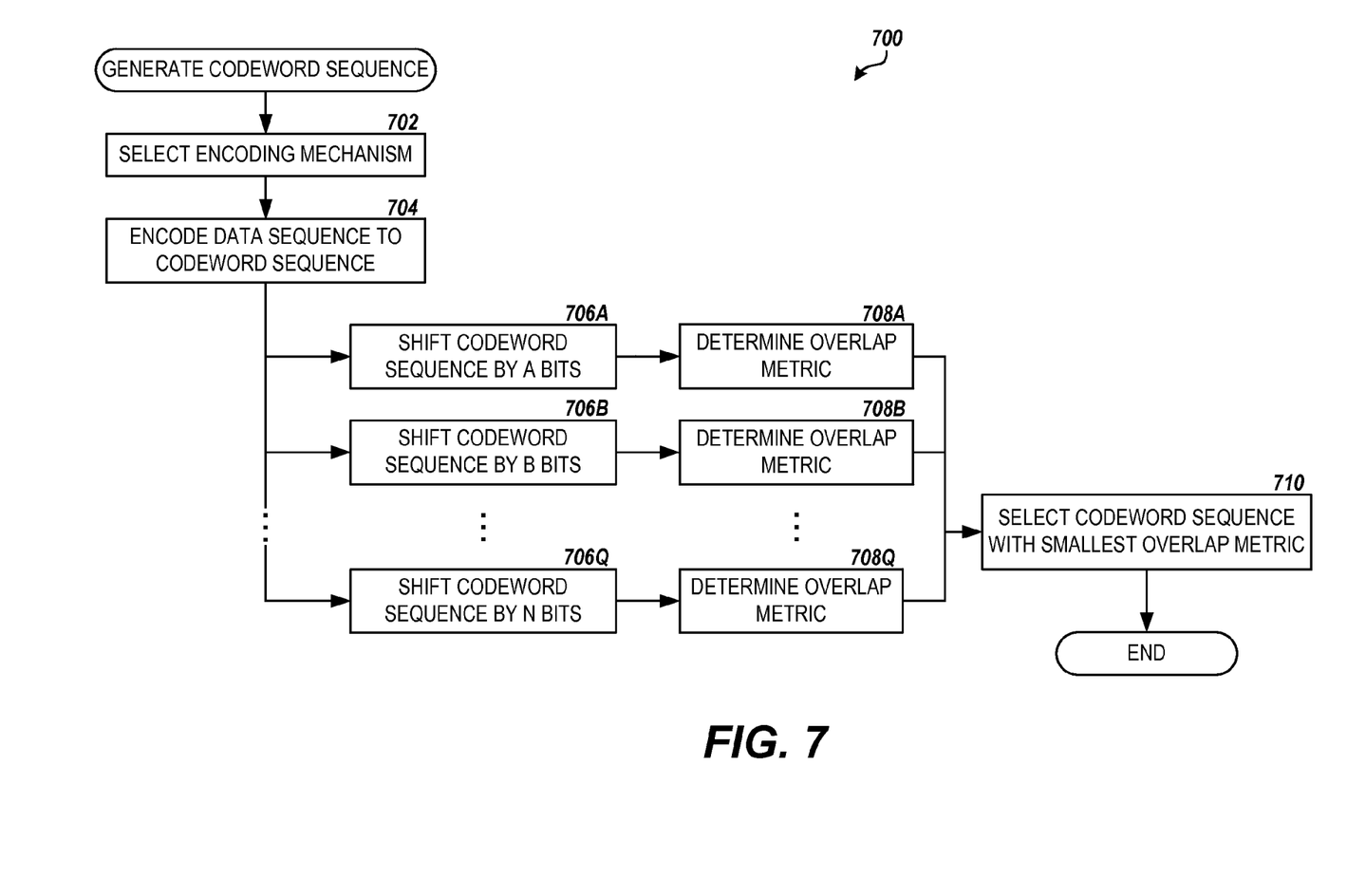
FIG. 7 is a flow diagram showing a parallel encoding routine of a two-dimensional modulation coding mechanism, according to embodiments described herein.

In other embodiments, a parallel encoding routine 700 may be implemented in the two-dimensional modulation encoder 228 to generate the codeword sequence 408, as shown in FIG. 7. In the parallel encoding routine 700, the two-dimensional modulation encoder 228 selects a modulation coding scheme and then encodes the received data sequence utilizing the selected modulation coding scheme to generate the codeword sequence 408 to be written to the target data track N+1 302B, as shown at steps 702 and 704. These operations may be done in similar fashion to steps 602 and 604 described above in regard to routine 600.

The two-dimensional modulation encoder 228 may then transform the generated codeword sequence 408 into some number Q of new, distinct sequences in parallel, as shown at steps 706A-706Q. For example, the codeword sequence 408 may be cyclically shifted by some different number of bits in each of the Q shifting operations. In some embodiments, 4096 shifting operations may be performed resulting in all 4096 possible cyclically shifts of the codeword sequence 408. In further embodiments, the parallel transformation operations 706A-706Q may comprise random mapping operations or scrambling operations using different seed values, or the like. Next the overlap metric is determined for each of the transformed codeword sequences 408, as shown at steps 708A-708Q. The overlap metric may be determined in a similar fashion to step 606 described above. Finally, at step 710 the two-dimensional modulation encoder 228 selects the codeword sequence 408 from among the parallel transformation operations 706A-706Q having the smallest overlap metric value for writing to the target data track N+1 402B. From step 710, the routine 700 ends.

While the parallel encoding routine 700 may provide better performance for the two-dimensional modulation encoder 228 over the serial encoding routine 600, it may also be more expensive to implement in the read-write channel 226 of the storage device. In further embodiments, a hybrid encoding routine may be utilized by the two-dimensional modulation encoder 228, with some operations being executed serially while others are executed in parallel, This may allow adaptation of the two-dimensional modulation encoder 228 to different channel conditions, recording media layouts, or implementation environments, Based on the foregoing, it will be appreciated that technologies for implementing modulation coding schemes for TDMR are presented herein. While embodiments are described herein in regard to an HDD device, it will be appreciated that the embodiments described in this disclosure may be utilized in any storage device containing data stored in substantially parallel or substantially concentric tracks on the storage media, including but not limited to, a magnetic disk drive, a hybrid magnetic and solid state drive, a magnetic tape drive, an optical disk storage device, an optical tape drive and the like. Further, while the embodiments described herein generate codeword sequences to be written to two adjacent data tracks N and N+1 on the recording media, it will be appreciated by one skilled in the art that the embodiments of this disclosure may be generalized for use in encoding of data sequences for any number of adjacent tracks, such as the generation of a codeword sequence to be written to track N based on data written to tracks N−1 and N−2, tracks N+1 and N+2, and the like. The above-described embodiments are merely possible examples of implementations, merely set forth for a clear understanding of the principles of the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
receiving at a controller a first data sequence to be stored on a first data track of a recording media;
encoding the first data sequence by the controller into a first codeword sequence using a first modulation coding scheme;
writing the first codeword sequence to the first data track;
receiving at the controller a second data sequence to be stored on a second data track adjacent to the first data track;
generating a second codeword sequence by the controller for the second data sequence based on the first codeword sequence; and
writing the second codeword sequence to the second data track.

2. The method of claim 1, wherein generating the second codeword sequence comprises:
encoding the second data sequence by the controller into the second codeword sequence;

determining an overlap metric by the controller for the second codeword sequence based on the first codeword sequence;

determining by the controller whether the overlap metric is less than a threshold level; and upon determining that the overlap metric is not less than the threshold level, transforming the second codeword sequence by the controller until the overlap metric is less than the threshold level.

3. The method of claim 2, wherein the overlap metric indicates an amount of alignment between long marks of the first codeword sequence and long marks of the second codeword sequence.

4. The method of claim 2, wherein the second data sequence is encoded by a second modulation coding scheme, the second modulation coding scheme being complimentary to the first modulation coding scheme based on a minimization of alignment of long marks between the first codeword sequence and the second codeword sequence.

5. The method of claim 4, wherein the second modulation coding scheme is selected from a table of complimentary encoders based on the first modulation coding scheme.

6. The method of claim 2, wherein transforming the second codeword sequence comprises shifting bits of the second codeword sequence by the controller until the overlap metric is minimized.

7. The method of claim 2, wherein transforming the second codeword sequence comprises mapping the second codeword sequence to a new codeword sequence having a smaller overlap metric based on the first codeword sequence.

8. The method of claim 1, wherein first codeword sequence written to the first data track is stored in adjacent track data in the controller.

9. The method of claim 1, wherein the first coding scheme comprises one of maximum transition run ("MTR") codes, running digital sum ("RDS") codes, and Markov codes.

10. The method of claim 1, wherein the generating is performed in a read/write channel of the controller.

11. The method of claim 1, wherein the recording media comprises a magnetic recording surface of a disk in a hard disk drive ("HDD")") operating as a two-dimensional magnetic recording device.

12. A system for storing data comprising:
a magnetic recording channel; and
a two-dimensional modulation encoder comprising a storage area containing adjacent track data, the two-dimensional modulation encoder configured to
receive a data sequence to be stored on a first data track of a recording media,
encode the data sequence into a first codeword sequence, and
transform the first codeword sequence such that alignment between the first codeword sequence and a second codeword sequence written to an adjacent track on the on the recording media are minimized.

13. The system of claim 12, wherein the second codeword sequence is retrieved from the adjacent track data.

14. The system of claim 12, wherein a first modulation coding scheme is selected to encode the data sequence based on a second modulation coding scheme used to generate the second codeword sequence.

15. The system of claim 12, wherein transforming the first codeword sequence comprises:

determining an overlap metric for the first codeword sequence based on the second codeword sequence;

determining whether the overlap metric is less than a threshold level; and upon determining that the overlap metric is not less than the threshold level, shifting bits of the first codeword sequence until the overlap metric is minimized.

16. The system of claim 12, wherein transforming the first codeword sequence comprises:

determining an overlap metric for the first codeword sequence based on the second codeword sequence;

determining whether the overlap metric is less than a threshold level; and upon determining that the overlap metric is not less than the threshold level, mapping the first codeword sequence to a new codeword sequence having a smaller overlap metric based on the second codeword sequence.

17. The system of claim 16, wherein mapping the first codeword sequence to the new codeword sequence comprises using a scrambling operation.

18. A method comprising steps of:
receiving at a controller a data sequence to be stored on a first data track of a recording media;

encoding the data sequence by the controller into a first codeword sequence using a modulation coding scheme;

determining an overlap metric by the controller for the first codeword sequence, the overlap metric indicating an amount of alignment between long marks of the first codeword sequence and long marks of a second codeword sequence written to an adjacent data track;

determining by the controller whether the overlap metric is less than a threshold level; and upon determining that the overlap metric is not less than the threshold level, transforming the first codeword sequence by the controller until the overlap metric is minimized.

19. The method of claim 18, wherein transforming the first codeword sequence comprises shifting bits of the first codeword sequence by the controller until the overlap metric is minimized.

20. The method of claim 18, wherein the second codeword sequence is retrieved from adjacent track data in the controller.

* * * * *